United States Patent [19]
Beckman

[11] 3,916,877
[45] Nov. 4, 1975

[54] TEMPERATURE AND PULSE DETECTOR
[75] Inventor: Paul Beckman, Huntington Valley, Pa.
[73] Assignee: United States Surgical Corporation, Baltimore, Md.
[22] Filed: Oct. 25, 1973
[21] Appl. No.: 409,382

[52] U.S. Cl. ........ 128/2.05 R; 128/2 H; 128/2.06 E; 73/344; 73/361
[51] Int. Cl.².... A61B 5/02; A61B 5/04; G01K 7/12
[58] Field of Search.................. 73/344, 361, 432 R; 128/2 H, 2.05 P, 2.06 E, 2.06 R, 2.05 R

[56] References Cited
UNITED STATES PATENTS

| | | | |
|---|---|---|---|
| 3,216,261 | 11/1965 | Brown et al. | 128/2.05 P X |
| 3,450,133 | 6/1969 | Birch, Jr. | 128/2.06 E |
| 3,499,435 | 3/1970 | Rockwell et al. | 128/2.06 E X |
| 3,688,580 | 9/1972 | Jarzembski | 73/361 |

*Primary Examiner*—Richard C. Queisser
*Assistant Examiner*—John S. Appleman
*Attorney, Agent, or Firm*—Fleit & Jacobson

[57] ABSTRACT

A temperature and pulse detector is disclosed having a disposable oral probe with a thermopile mounted thereon. The thermopile acts as a temperature sensor and the thermopile hot junctions as one of the electrodes for pulse detection. The other pulse detection electrode is mounted on a connector housing which holds the disposable probe. In use, the patient holds the connector housing with his left hand so that his thumb contacts the electrode mounted thereon and places the probe in his mouth. The patient's temperature is sensed by the thermopile and his pulse rate derived from the electrical activity of the heart sensed by the electrodes.

26 Claims, 6 Drawing Figures

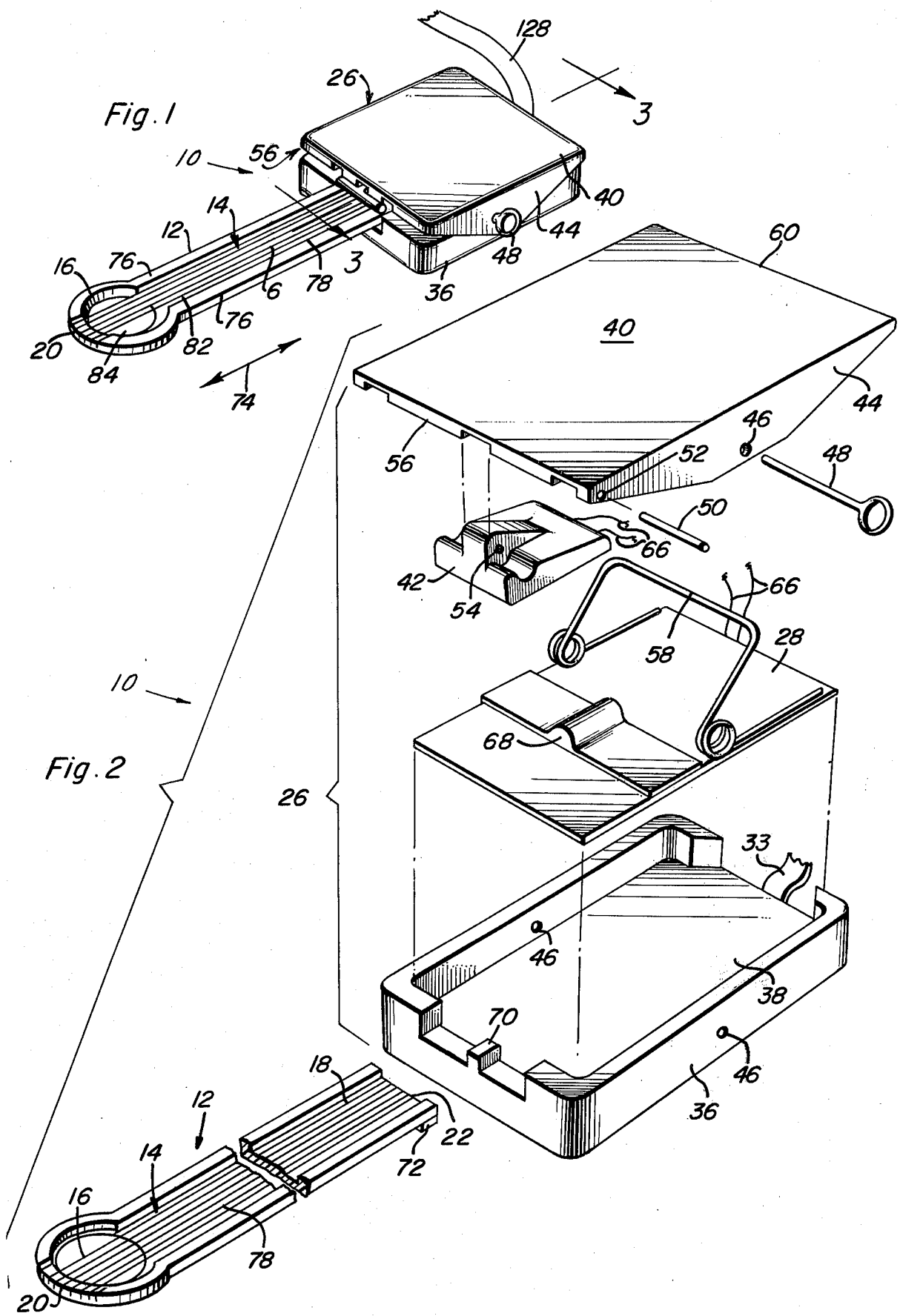

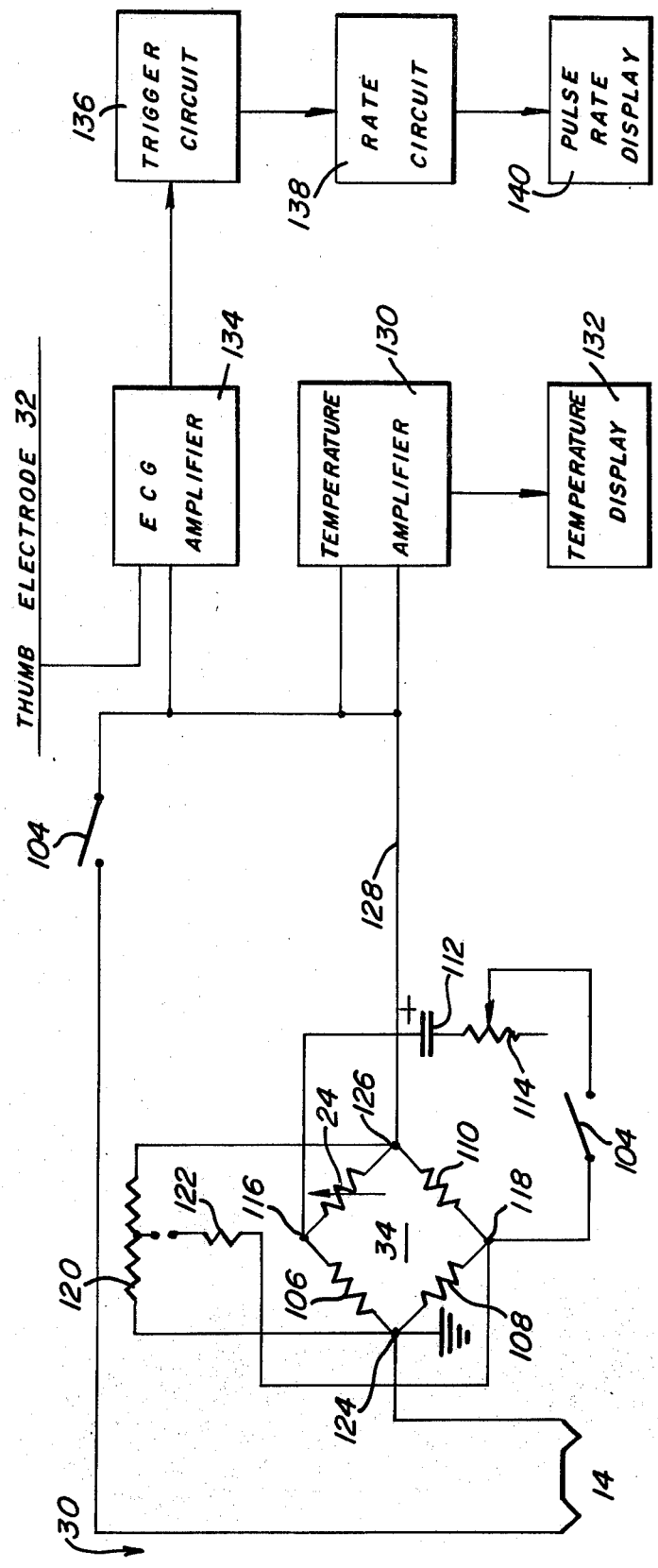
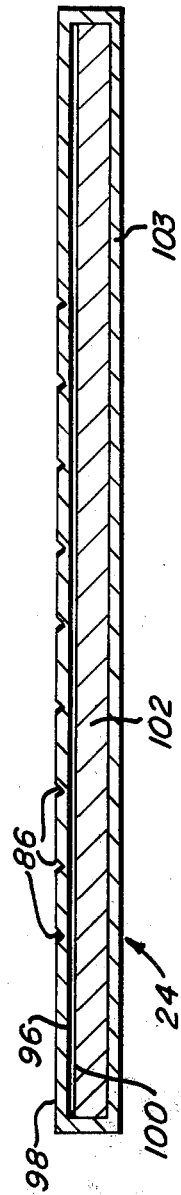
Fig. 6
Fig. 5 ject of the present invention is to pro-
TEMPERATURE AND PULSE DETECTOR

CROSS-REFERENCE TO RELATED APPLICATION

This application is related to my copending application Ser. No. 398,327, filed Sept. 18, 1973 for "Clinical Thermometer," which is a continuation-in-part of my application Ser. No. 324,015, filed Jan. 16, 1973, now abandoned.

BACKGROUND OF THE INVENTION

This invention relates to a temperature and pulse detector. More particularly, this invention relates to a combined temperature and pulse detector in which a patient's oral temperature and pulse rate can be determined simultaneously.

It is well known to use electrodes for detecting the electrical activity of the heart for the purpose of obtaining an electrocardiogram (ECG) and for measuring heart rate. With each heart beat, an electrical impulse passes through the heart resulting in the rhythmic contraction of the heart muscle. As the impulse passes through the heart, electrical currents spread into the tissue surrounding the heart, and a small portion of these spread all the way to the surface of the body. If electrodes are placed on the body on opposite sides of the heart, the electrical potentials generated by the heart can be sensed and recorded.

The ECG waveform contains several distinct characteristics generally labeled P, Q, R, S and T. Each ECG waveform represents one heart beat. The QRS portion or "R wave" is the portion of the waveform normally used to trigger heart rate monitors. The R wave has high amplitude and short duration and is made up of the highest frequency components of the ECG waveform. Accordingly, the R wave can be further accentuated over the P and T waves by the use of a high pass filter or waveform differentiation circuit. The heart rate is then derived from the time duration between R waves.

Metal plates are typically used as the electrodes for detecting the electrical activity of the heart. These electrode plates are normally strapped to various parts of the body with some type of conductive paste or gel applied to the skin under the plate. Other forms of electrodes include metal dust and adhesive coated on the body with a lead wire embedded therein. In either case, however, the mounting of the electrodes on the body is time consuming and unpleasant for the patient.

The simultaneous detection of temperature and pulse is highly desirable since it results in considerable time saving and a reduction in hospital costs. Prior art systems have been developed for simultaneously sensing these two parameters but these systems typically employ the use of a pressure transducer for sensing arterial pulsations or other types of devices which must be semi-permanently attached to the body.

These prior art systems are complex employing separate temperature and pulse sensors and do not lead to savings in time or reduction in hospital operating costs.

SUMMARY OF THE INVENTION

An object of the present invention is to provide an improved apparatus for simultaneously sensing temperature and pulse rate.

Another object of the present invention is to provide an improved apparatus for sensing pulse rate.

Still another object of the present invention is to provide a temperature and pulse detector in which the temperature sensing means also acts as one of the electrodes for sensing pulse.

Yet another object of the present invention is to provide a temperature and pulse detector in which temperature and pulse can be detected quickly and easily.

A combined temperature and pulse detector is provided in accordance with the present invention having an oral probe with a temperature sensor and electrode for pulse detection mounted thereon. In accordance with one embodiment of the invention, a thermopile acts as the temperature sensor and the hot junctions of the thermopile as an electrode for pulse detection. The other pulse detection electrode is mounted on a connector housing which holds the disposable probe. In use, the patient holds the connector housing with his left hand so that his thumb contacts the electrode mounted thereon and places the probe in his mouth. The patient's temperature is sensed by the thermopile and his pulse rate derived from the electrical activity of the heart sensed by the electrodes. With this arrangement the patient's temperature and pulse can be detected quickly and easily and without the time consuming and unpleasant attachment of electrodes to the patient's body.

BRIEF DESCRIPTION OF THE DRAWINGS

FIG. 1 is a perspective view of the combined temperature and pulse detector system showing the probe and the connector housing;

FIG. 2 is a perspective, exploded view of the connector housing showing the insertion of the probe;

FIG. 5 is a cross-sectional view of the resistance thermometer mechanism of FIg. 4, and FIG. 6 is the circuit diagram of the combined temperature and pulse detector system.

DESCRIPTION OF THE PREFERRED EMBODIMENTS

Figure 3:
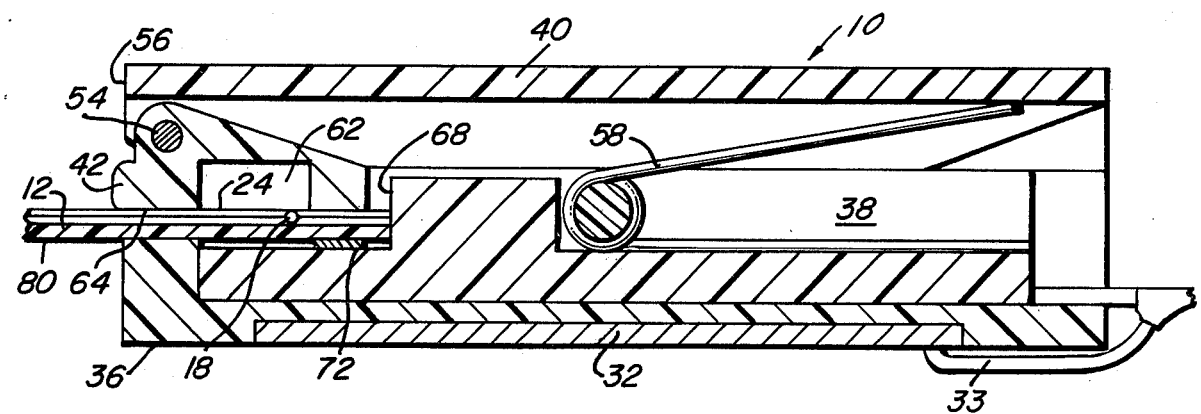
FIG. 3 is a cross-sectional view of the connector housing, inserted probe and thumb electrode taken along line 3-3 of FIG. 1.

Referring now to FIGS. 1, 2 and 3, there is shown a combined temperature and pulse detector 10 for determining body temperature through generation of an electromotive force which can be translated into a reading in degrees of temperature and for determining pulse rate from an ECG waveform. In general, detector 10 comprises a modular system constructed to allow a temperature and pulse reading to be taken simultaneously and in a matter of seconds. Detector 10 may be utilized in hospitals or other medical centers for simultaneously taking an accurate and quick oral temperature and pulse rate reading in patients.

Detector 10 comprises probe 12 which has thermopile 14 mounted thereon. Thermopile 14 comprises a plurality of thermocouples connected in series defining measuring or hot junctions 16 formed near first end 20 and associated cold or reference junctions 18 formed near second end 22. Resistance thermometer mechanism 24 is included within connector housing 26 for measuring the temperature of cold junctions 18 of thermopile 14. Thumb electrode 32 is mounted on the bottom of connector housing 26 and acts as one of the electrodes for determining pulse. Electrical circuit 30 which is partially mounted on circuit board 28 and partially within a separate housing (not shown) is shown in FIG. 6. Electrical circuit 30 measures the temperature sensed at hot junctions 16 of thermopile 14 and derives the patient's pulse rate from the electrical activity of the heart sensed by thumb electrode 32 and the oral electrode comprising hot junctions 16. Resistance thermometer mechanism 24 compensates for fluctuations in the temperature of cold junctions 18 and forms one arm of bridge circuit 34.

Connector housing 26 provides a mechanism for housing resistance thermometer mechanism 24, circuit board 28 and thumb electrode 32 and for releasably mounting probe 12 in a predetermined position. Connector housing 26 includes connector housing base 36 having recess 38 formed therein. Circuit board 28 containing a portion of bridge circuit 34 is mounted in connector housing base 36 within recess 38. The upper portion of connector housing 26 defines a mechanism for locating resistance thermometer mechanism 24 in good physical and thermal contact with cold junctions 18 of thermopile 14 and includes upper connector housing 40 and connector housing pivot element 42.

Upper connector housing 40 has opposed longitudinal walls 44 and is pivotally connected to connector housing base 36 by inserting pivot pin 48 through pivot opening 46. Connector housing pivot element 42 is pivotally mounted to upper connector housing 40 at forward end 56 by insertion of pivot pin 50 through pivot openings 52, 54 therein, as shown in FIGS. 2 and 3. Resistance thermometer mechanism 24 is mounted on the lower surface of pivot element 42.

Spring 58 releasably secures probe 12 within connector housing 26 in a predetermined position. Spring 58 is mounted on the upper surface of circuit board 28 and bears against upper connector housing 40 near rear end 60 thus forcing forward end 56 downward toward the forward end of base 36. Manual grasping and displacement of rear end 60 of upper connector housing 40 toward base 36 permits insertion of probe 12. After probe 12 is inserted into its proper position, rear end 60 is released and probe 12 thereby mounted in the predetermined position within conductor housing 26.

Resistance thermometer mechanism 24, which is mounted on the lower surface of pivot element 42, is positioned in good physical and thermal contact with cold junctions 18 when probe member 12 is inserted into connector housing 26. Pivot element 42, as shown in FIG. 3, has a cavity 62 formed in lower surface 64 thereof. Resistance thermometer mechanism 24 closes cavity 62 and is electrically connected to electrical bridge circuit 34 on circuit board 28 through appropriate electrical leads. The positioning of resistance thermometer mechanism 24 over cavity 62 permits a fast temperature response time when measuring the temperature of cold junctions 18 located on probe 12.

Stop member 68 is secured to circuit board 28 to provide accurate positioning of probe 12 within connector housing 26. Stop member 68 prevents longitudinal passage of probe 12 beyond a predetermined point during insertion of probe 12 into housing 26. Projection 70 is formed on a forward end connector housing base 36 and contacts lower surface 80 of probe 12 after insertion of probe 12 into connector housing 26. Contacts 72 extend downward in a vertical direction from the lower surface of probe 12 and provide electrical connection between thermopile 14 and electrical circuit 30 partially mounted on circuit board 28. Connector housing base 36, upper connector housing 40 and connector housing pivot element 42 are constructed of an electrically non-conductive material such as plastic.

Probe 12 comprises an elongated member having its longitudinal dimension in the direction of arrow 74. Probe 12 includes first end 20 which is provided with an enlarged head of suitable size and shape for taking the oral temperature of a patient, and second end 22 which is adapted to be inserted into connector housing 26. Probe 12 includes a pair of side walls 76 which define upper base surface 78 therebetween on which thermopile 14 is mounted. Vertically extending side walls 76 are discontinuous at first end 20 in order to permit the wire making up thermopile 14 to be wound around probe 12 from upper surface 78 to lower surface 80. In general, probe 12 can be formed as a single piece of plastic or like material which is substantially electrically non-conductive. Probe 12 is usually at least three inches long and preferably has a length of about four and preferably one-half inches for most uses. Thickness on the order of 65 to 75 mils has been found to be suitable.

Thermopile 14 comprises a predetermined length of wire which is wound around probe 12 in the longitudinal direction 74 as is shown in FIGS. 1 and 2. Wire 82 runs above top surface 78 of probe 12 and below lower surface 80. The two ends of the continuously wound wire terminate at contacts 72 which are mounted near second end 22 on lower surface 80. Wire 82 is spaced apart and is electrically insulated by air gaps between adjacent wires.

Thermopile 14 preferably comprises three to ten complete turns of wire 82. When more than ten turns are employed, the accuracy of the temperature reading is normally not improved. However, more than ten turns can be employed if desired. For example, experiments have been run with up to twenty complete turns of wire 82 and good temperature readings obtained. The use of only two wire turns is not desirable because of the difficulty of obtaining an accurate temperature reading. More specifically, it is very difficult to obtain a good average temperature reading when only two wire turns are employed. The use of only one turn of wire has proved totally unsatisfactory for obtaining accurate temperature readings. More specifically, the voltage output of a single turn of wire is too low and, because of the "point" contact with the patient's body, an average temperature cannot be obtained. For example, when taking an oral temperature reading, the patient's mouth may be dry resulting in a temperature reading one or two degrees higher than the actual oral temperature. Further, localized impurities in the thermocouple may result in false temperature readings when only one turn of wire is used. However, it should be stressed that accurate pulse readings can be obtained even when a single turn of wire is employed.

Recess 84 is formed in first end 20 of probe 12 as shown in FIGS. 1 and 2. Wire 82 passes over recess 84 with hot junctions 16 being positioned over recess 84. Recess 84 provides an air gap between the surface of probe 12 and wire 82. This forms a thermal insulation barrier between wire 82 and probe 12 and results in a fast temperature response time. Recess 84 also allows hot junctions 16 to come into more intimate contact with the body, typically the patient's tongue, and to allow saliva to surround the hot junctions resulting in a quicker and more accurate temperature reading. The saliva also acts as an electrolyte permitting the accurate sensing of pulse. It should be appreciated that recess 84 can be of different size and shape and that hot junctions 16 can be thermally insulated from probe 12 in various other ways not specifically illustrated.

Thermopile 14, comprising wire 82, can conveniently be formed from a first metal having a second dissimilar metal plated thereon. The second dissimilar metal can be selectively plated on the first metal after the first metal has been wound around probe 12 or, alternatively, can be plated thereon before winding and selectively deplated after winding. In the drawings, the darker portion of wire 82 represents the combination of the first and second dissimilar metals and the lighter portion represents only the first metal.

As just described, thermopile 14 is made up of wire 82 which is essentially composed of two dissimilar metals. The first or base metal generally has the lower electrical conductivity of the two dissimilar metals. The first metal can be constantan or nickel, as well as fungsten, alumel, stainless steel, platinum, palladium or other such metals. The second metal generally has a higher electrical conductivity than the first metal and extends between a first plating point and a second plating point on the upper surface 78 of probe 12. Each of these plating points defines one of the hot and cold junctions 16 and 18, respectively. The second metal can be copper or other metal such as silver or gold which has a higher electrical conductivity. It has been found that if constantan or other base metal wire of about one to five mils in diameter is used, a copper or second metal coating of approximately one to five mils will be satisfactory. First or base metal wires of over five mils in diameter are difficult to wind and wires of less than one mil are expensive to manufacture and may not be homogeneous.

The temperature of cold junctions 18 is allowed to vary as a function of atmospheric conditions. However, the temperature of hot junctions 16 is read out as an absolute temperature by incorporation of resistance thermometer mechanism 24 into electrical circuit 30 in which it forms one arm of bridge circuit 34 as shown in FIG. 6 and compensates for changes in the temperature of cold junctions 18.

Figure 4:
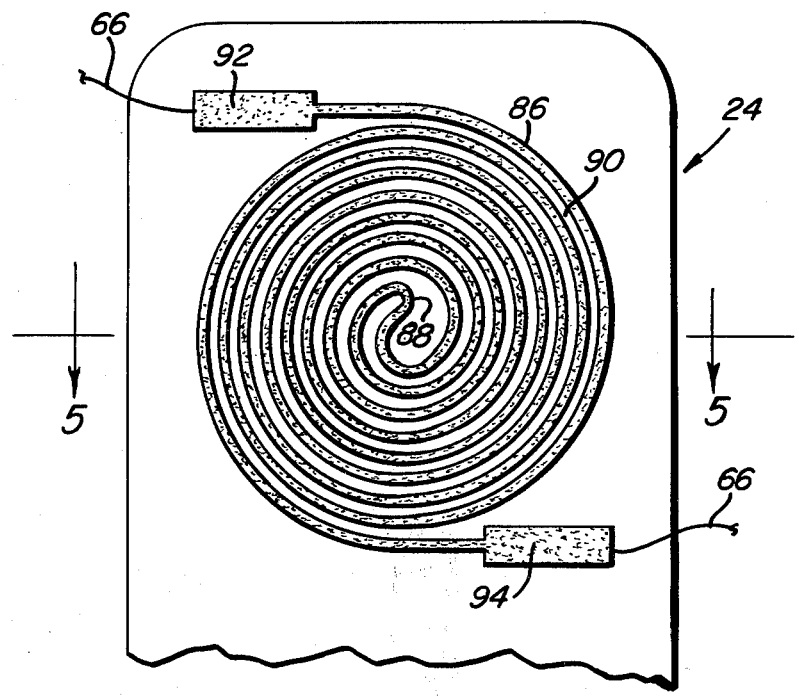
FIG. 4 is a plan view of the resistance thermometer mechanism.

The principle of operation of resistance thermometer mechanisms is well known in the art. In these mechanisms, the change in resistance of a conductor with temperature change is used to measure temperature. Metals commonly used as the sensitive element in resistance thermometers are copper, platinum and nickel. Copper is particularly preferred herein because it has a positive linear temperature coefficient of resistance over the temperature range contemplated. Referring to FIGS. 4 and 5, resistance thermometer mechanism 24 comprises a bi-filar spiral 86 of copper, typically about 2.5 mils in diameter, having a sharp reverse turn 88 located substantially near the center of the spiral. The turns of spiral 86 do not contact each other but are spaced apart at 90 so that the turns are electrically insulated from each other. Spiral 86 has first contact end 92 and second contact end 94 as is shown in FIG. 4. Leads 66 are connected to contact ends 92 and 94 and are used for inserting thermometer mechanism 24 into bridge circuit 34. A number of well known configurations for electrical contacts 92 and 94 can be used to provide the proper electrical connections within circuit 30.

In construction, resistance thermometer mechanism 24 includes electrically non-conductive base 96 such as a plastic layer having substantially opposed planar surfaces 98 and 100, respectively. Copper spiral 86 is securely mounted on surface 98 of base 96 by any conventional technique such as conventional etching techniques used in making etched copper circuits. Thermally conductive pad 102 is mounted on surface 100 of non-conductive base 96. Pad 102 is typically made of the same material as copper spiral 86. However, any material which has a similar coefficient of expansion such as nickel, berylium, stainless steel, or gold can be used. Resistance thermometer mechanism 24 can be sheathed in a thin protective film 103 of plastic, silicon, rubber or similar material if desired. The diameter of resistance thermometer mechanism 24 is on the order of 5 millimeters, with pad 102 being on the order of three to five mils in thickness. Resistance thermometer mechanism 24 can be mounted to pivot element 42 with bi-filar spiral 86 facing toward or away from cavity 62. Further details concerning probe 12, resistance thermometer mechanism 24 and connector housing 26 are found in my copending application Ser. No. 398,327, filed Sept. 18, 1973, for "Clinical Thermometer," the disclosure of which is expressly incorporated herein by reference.

Thumb electrode 32 can be mounted on the bottom of connector housing 26 in a number of ways. For the purposes of illustration, thumb electrode 32 is shown mounted in a recess in connector housing base 36. The electrode can be attached to connector housing 26 by any suitable technique such as by the use of an epoxy adhesive. The shape of thumb electrode 32 is not critical with a circular shape being employed in accordance with present designs. obviously, thumb electrode 32 must be sufficiently large so that good contact is made with the thumb. Although a thumb electrode has been shown, it is also possible to mount electrode 32 on the top connector housing 26 either on the surface of upper connector housing 40 or in a suitable recess therein. If electrode 32 is mounted in this manner, it will be contacted by the index finger rather than the thumb. A usable ECG waveform can be derived from either a finger or thumb electrode. Electrode 32 can be any conventional biopotential electrode; however, a phosphor bronze electrode is presently preferred. Thumb electrode 32 is connected to the circuitry for measuring pulse by lead 33.

Circuit 30 and the electrical connections between each of the basic elements of detector 10 are shown in FIG. 6. By incorporation of resistance thermometer mechanism 24 into bridge circuit 34 in association with resistors 106, 108 and 110, an absolute temperature reading can be obtained, even with a fluctuating cold junction temperature. Bridge circuits of this type are well known in the art. As is conventional resistors 106, 108 and 110 have low temperature coefficients.

Battery 112 is placed in series with voltage adjustment potentiometer 114, and these elements are connected to bridge circuit 34 at nodal points 116 and 118. The electrical sensitivity of bridge circuit 34 is made as nearly equal to the sensitivity of thermopile 14 as possible. This can be easily accomplished since the sensitivity of thermopile 14 is a function of the number of turns of wire 82, and since the resistance changes of copper which make up copper spiral 86 are known as a function of temperature. With these known characteristics of the system, determination of the voltage to be supplied to the bridge circuit 34 can easily be derived in a conventional manner. In actual practice, a 500 ohm voltage adjustment potentiometer 114 has been used in series with battery 112, which is approximately 1 ½ volts. In this manner, a voltage of approximately ½ volt is put across bridge circuit 34. Null adjustment potentiometer 120 is connected in series with resistor 122 which somewhat desensitizes potentiometer 120. By electrically connecting potentiometer 120 and resistor 122 to nodal points 124, 118 and 126 as shown in FIG. 6, the null point of bridge circuit 34 can be easily adjusted.

The connection between thermopile 14, thumb electrode 32 and the circuitry for registering temperature and pulse is made through multi-lead cable 128. Switch 104 is used to connect battery 112 to bridge circuit 34 and thermopile 14 to the temperature and pulse registering circuitry. This is done so that battery 112 is only in an "on" condition during the time that switch 104 is actuated and measurements are being taken, otherwise battery 112 would be continually "on" and would run down rather quickly. Alternatively, a standard 110 voltage supply could be used in which event conventional rectification and voltage regulation would be employed.

Thermopile mechanism 14 develops a voltage which is proportional to the temperature difference between its hot and cold junctions. The voltage across nodes 124, 126 of the bridge circuit is proportional to the temperature measured by resistance thermometer mechanism 24. Voltage adjustment potentiometer 114 adjusts the input voltage to bridge 34 across terminals 116 and 118 so that the sensitivity of bridge circuit 34 substantially matches that of thermopile 14. Null adjustment potentiometer 120 is correspondingly set so that bridge 34 is balanced when resistance thermometer mechanism 24 is at a temperature reading which corresponds to zero voltage. Since resistance thermometer mechanism 24 is in thermal contact with the reference junctions 18 of thermopile 14, the total output voltage of bridge circuit 34 and thermopile 14 is proportional to the temperature of hot junctions 16.

In use, second end 22 of probe 112 is releasably secured in connector housing 26. As previously discussed, connector housing 26 is constructed so that cold junctions 18 will be in good physical and thermal contact with resistance thermometer mechanism 24. Copper spiral 86 and cold junctions 18 will reach thermal equilibrium in about one or two seconds. The patient is then asked to hold connector housing 26 in his left hand so that his thumb contacts thumb electrode 32. The patient's right thumb may also be used on the thumb electrode; however, this will result in a reduced R wave. If desired, a conductive paste or gel can be applied to the patient's thumb to improve the electrical contact. Probe 12 is now ready to be inserted into the patient's mouth.

With the illustrated construction of probe 12, the bottom of the tongue will lie flush against hot junctions 16. In this position saliva and mucus can surround hot junctions 16 and collect in recess 84. This intimate physical contact enables hot junctions 16 to quickly reach the patient's body temperature, namely, within a matter of milliseconds. A fast temperature response time is essential to the taking of an accurate reading since the patient's oral temperature will be lowered somewhat by the relatively colder probe 12. However, this temperature change will not occur to any appreciable extent within the temperature response time of thermopile 14. Also, the saliva will act as an electrolyte and provide good electrical contact between hot junctions 14 and the patient's mouth.

After first end 20 of probe 13 is inserted into the patient's mouth switch 104 is depressed. The output of bridge circuit 34 and thermopile 14 which is proportional to the temperature of hot junctions 16 is amplified in conventional "temperature" amplifier 130 and the maximum temperature reading displayed on temperature display 132, which can comprise a conventional peak and hold circuit. The output signal from thumb electrode 32 and hot junctions 16 is amplified in standard ECG amplifier 134 and passed through trigger circuit 136. The output signal from trigger circuit 136, typically a Schmidt trigger, is fed through rate circuit 138 which could be an integrator associated with a timing circuit for resetting the integrator to zero or a leaky capacitor whose equilibrium voltage is proportional to pulse rate. Finally, the pulse rate is displayed on pulse rate display 140. If desired, the ECG waveform can be displayed on an oscilloscope, electrocardiograph or other device for monitoring the electrical activity of the heart.

While detector 10 has been specifically described as being useful for taking temperature and pulse readings, it should be understood that detector 10 can also be used for determining respiration rate. If a respiration rate reading is desired, first end 20 of probe 12 is held in front of the patient's nose or mouth, switch 104 depressed and the patient asked to breath normally. The respiration rate can then be determined by observing the fluctuations of a galvanometer connected to the output of thermopile 14 and bridge circuit 34. Alternatively, the output signal from thermopile 14 and bridge circuit 34 can be fed through conventional electronic means including, for example, an amplifier, discriminator and counter to produce a reading indicative of breaths per unit of time.

Although only a single embodiment of the present invention has been described herein, it should be appreciated that there are many modifications falling within its scope. For example, it should be recognized that detector 10 can be used as either a temperature or pulse detector without simultaneously detecting the other bodily function. Additionally, although a thermopile has been described which functions both as a temperature sensor and acts as an oral electrode for pulse detection, it should be recognized that a separate electrode could be provided on the probe for sensing the electrical activity of the heart. Accordingly, the present invention should only be limited as defined in the appended claims.

What is claimed is:

1. An apparatus for simultaneously sensing body temperature and the electrical activity of the heart comprising an oral probe, first electrode means mounted on said probe for insertion into the mouth to simultaneously sense body temperature and act as an electrode means for sensing the electrical activity of the heart, second electrode means, means for mounting said second electrode means for contact with the body, said first and second electrode means acting to sense the electrical activity of the heart when said first electrode means is inserted into the mouth and said second electrode means is simultaneously contacted with the body, and electrical means connected to said first electrode means to determine body temperature and to said first and second electrode means to determine electrical activity of the heart.

2. The apparatus of claim 1 and further comprising means for determining pulse rate from the sensed electrical activity of the heart.

3. The apparatus of claim 1 in which said first electrode means comprises a sensor which develops a voltage proportional to the temperature sensed.

4. The apparatus of claim 3 in which said first electrode means comprises thermocouple means.

5. The apparatus of claim 3 and further comprising means for translating the developed voltage into a reading in degrees of temperature.

6. The apparatus of claim 1 and further comprising means for holding said probe, said second electrode means being mounted on the bottom of said probe holding means for being contacted by the thumb.

7. The apparatus of claim 1 in which said probe comprises an elongated, electrically non-conductive member having a first end of suitable size for insertion into the mouth.

8. The apparatus of claim 7 in which said first electrode means comprises thermopile means having a plurality of thermocouples connected in series mounted on said probe member and defining a plurality of hot junctions near said first end of said probe member and a plurality of cold junctions near a second end of said probe member.

9. The apparatus of claim 8 in which said thermopile means comprises a first metal wire wound around said probe member in the longitudinal direction thereof and a second metal joined to said first metal wire between said hot and cold junctions.

10. The apparatus of claim 8 and further comprising means for holding said probe, resistance thermometer means for measuring the temperature of said cold junctions of said thermopile means mounted in said probe holding means and means for releasably securing said second end of said probe member in said probe holding means in a predetermined position so that said cold junctions are positioned in physical and thermal contact with said resistance thermometer means.

11. The apparatus of claim 10 and further comprising electrical circuit means for measuring the temperature of said hot junctions of said thermopile means, said electrical circuit means including a bridge circuit in which said resistance thermometer means forms one arm of said bridge circuit means for measuring the temperature of said cold junctions, at least a portion of said bridge circuit means being mounted in said probe holding means so that said thermopile means is electrically connected to said electrical circuit means when said probe is releasably secured in said probe holding means, said electrical circuit means combining the output of said thermopile means and said bridge circuit to give a signal proportional to the temperature of said hot junctions.

12. An apparatus for simultaneously sensing body temperature and the electrical activity of the heart comprising an oral probe, first electrode means mounted on said probe for insertion into the mouth to simultaneously sense body temperature and act as an electrode means for sensing the electrical activity of the heart, means for holding said probe, and second electrode means mounted on said probe holding means, said first and second electrode means acting to sense the electrical activity of the heart when said first electrode means is inserted into the mouth and said second electrode means is simultaneously contacted by the hand.

13. The apparatus of claim 12 and further comprising means for determining pulse rate from the sensed electrical activity of the heart.

14. The apparatus of claim 12 in which said first electrode means comprises a sensor which develops a voltage proportional to the temperature sensed.

15. The apparatus of claim 14 in which said first electrode means comprises thermocouple means.

16. The apparatus of claim 3 and further ccomprising means for translating the developed voltage into a reading in degrees of temperature.

17. The apparatus of claim 1 in which said second electrode means is mounted on the bottom of said probe holding means for being contacted by the thumb.

18. The apparatus of claim 1 in which said probe comprises an elongated, electrically non-conductive member having a first end of suitable size for insertion into the mouth.

19. The apparatus of claim 18 in which said first electrode means comprises thermopile means having a plurality of thermocouples connected in series mounted on said probe member and defining a plurality of hot junctions near said first end of said probe member and a plurality of cold junctions near a second end of said probe member.

20. The apparatus of claim 19 in which said thermopile means comprises a first metal wire wound around said probe member in the longitudinal direction thereof and a second metal joined to said first metal wire between said hot and cold junctions.

21. The apparatus of claim 19 and further comprising resistance thermometer means for measuring the temperature of said cold junctions of said thermopile means mounted in said probe holding means and means for releasably securing said second end of said probe member in said probe holding means in a predetermined position so that said cold junctions are positioned in physical and thermal contact with said resistance thermometer means.

22. The apparatus of claim 21 and further comprising electrical circuit means for measuring the temperature of said hot junctions of said thermopile means, said electrical circuit means including a bridge circuit in which said resistance thermometer means forms one arm of said bridge circuit means for measuring the temperature of said cold junctions, at least a portion of said bridge circuit means being mounted in said probe holding means so that said thermopile means is electrically connected to said electrical circuit means when said probe is releasably secured in said probe holding means, said electrical circuit means combining the output of said thermopile means and said bridge circuit to give a signal proportional to the temperature of said hot junctions.

23. An apparatus for sensing the electrical activity of the heart comprising an oral probe, first electrode means mounted on said probe for insertion into the mouth, means for holding said probe, and second electrode means mounted on the bottom of said probe holding means for being contacted by the thumb, said first and second electrode means acting to sense the electrical activity of the heart when said first electrode means is inserted into the mouth and said second electrode means is simultaneously contacted by the thumb.

24. The apparatus of claim 23 and further comprising means for determining pulse rate from the sensed electrical activity of the heart.

25. The apparatus of claim 23 in which said second electrode means is a phosphor bronze electrode.

26. The apparatus of claim 23 in which said probe is disposable and is detachably mountable in said probe holding means.

* * * * *